US000001387H

United States Statutory Invention Registration [19]

[11] Reg. Number: H1387

Hansen et al.

[43] Published: Dec. 6, 1994

[54] POLYPHENYLENE ETHER/THERMOPLASTIC ELASTOMER BLOCK COPOLYMER BLENDS FOR ADHESIVES AND SEALANTS

[75] Inventors: David R. Hansen; Glenn R. Himes; Steven S. Chin, all of Houston, Tex.

[73] Assignee: Shell Oil Company, Houston, Tex.

[21] Appl. No.: 149,594

[22] Filed: Nov. 9, 1993

[51] Int. Cl.[5] ..... C08L 53/00

[52] U.S. Cl. ..... 525/92; 525/103; 525/905

[58] Field of Search ..... 525/91, 152, 133, 905

[56] References Cited

U.S. PATENT DOCUMENTS

| | | | |
|---|---|---|---|
| 4,104,323 | 8/1978 | Hansen | 524/505 |
| 4,141,876 | 2/1979 | Hansen | 525/92 |
| 4,189,411 | 2/1980 | Haaf | 525/132 |
| 4,252,913 | 2/1981 | Katchman et al. | 525/93 |
| 4,283,503 | 8/1981 | Wright | 525/89 |
| 4,314,926 | 2/1982 | Allison, III | 525/93 |
| 4,360,568 | 11/1982 | Allison, III | 428/462 |
| 4,764,559 | 8/1988 | Yamauchi et al. | 525/92 |
| 4,826,919 | 5/1989 | Haaf et al. | 525/68 |
| 5,008,314 | 4/1991 | Lee | 524/143 |
| 5,034,459 | 7/1991 | Haaf et al. | 525/68 |
| 5,091,256 | 2/1992 | Bopp et al. | 428/402 |

FOREIGN PATENT DOCUMENTS

90/14397 11/1990 WIPO .

*Primary Examiner*—Robert L. Stoll
*Assistant Examiner*—Joseph D. Anthony

[57] ABSTRACT

The present invention provides a method for making a method for making high service temperature rubber compound, hot melt adhesive or sealant compositions by combining a polyphenylene ether resin with an elastomeric block copolymer of a vinyl aromatic hydrocarbon and a conjugated diene, which comprises (a) making a masterbatch of 2 to 50 phr of a polyphenylene ether having an intrinsic viscosity of 0.3 deciliters per gram or more and 100 phr of said block copolymer by extruding them together with 2 to 30 phr of an endblock compatible resin, and (b) optionally mixing the masterbatch with more of the block copolymer.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYPHENYLENE ETHER/THERMOPLASTIC ELASTOMER BLOCK COPOLYMER BLENDS FOR ADHESIVES AND SEALANTS

BACKGROUND OF THE INVENTION

The present invention relates to high service temperature block copolymers which contain polyphenylene ether resins and block copolymers of vinyl aromatic hydrocarbons and conjugated dienes. More particularly, the present invention relates to a method for making improved high service temperature block copolymer blends which can be used for rubber compounds and hot melt adhesive and sealant compositions utilizing polyphenylene ether resins and such elastomeric block copolymers.

Hot melt adhesive compositions containing polyphenylene ether resins and block copolymers of vinyl aromatic hydrocarbons and conjugated dienes are well known. In U.S. Pat. Nos. 4,104,323 and 4,141,876, the patentee describes such hot melt adhesive compositions containing low molecular weight polyphenylene ether (PPE) resins. Such low molecular weight PPEs have a molecular weight as described by intrinsic viscosity of less than 0.3 deciliters per gram. The patents also describe blends of such block copolymers and PPEs with higher viscosities, i.e. 0.3 deciliters per gram or more and show that the blends with the lower molecular weight PPEs are superior to those using the higher molecular weight PPEs.

In commercial practice, it has proved difficult to use either the blends with the high molecular weight PPE or the low molecular weight PPE in adhesive and sealant formulations. It has proved very difficult to adequately mix the PPEs with the block copolymers in commercial equipment. This is most likely due to the limitations of the equipment which is most often used by formulators who are interested in making hot melt adhesives or sealants with these materials. Such compounders and formulators normally use lower viscosity materials than PPE and thus do not require high intensity mixing apparatus.

Therefore, it would be very advantageous if a way were found to permit these high service temperature adhesive and sealant compositions to be made in the currently commercially used low intensity mixing equipment such as Sigma Blade mixers. The present invention provides such a method and allows the formulator or compounder to achieve a very. good compatible mixture of these materials while using the lower cost mixing methods which are currently being used commercially today.

The aforementioned U.S. Pat. Nos. 4,104,323 and 4,141,876 describe the advantages of utilizing lower molecular weight PPEs, i.e. the ability to achieve high service temperatures in the blends while avoiding the high viscosity which is a characteristic of the higher molecular weight PPEs. The lower molecular weight PPEs are difficult to make commercially. Therefore, it would be an advantage to find a way to make a lower viscosity high service temperature blend using the higher molecular weight PPEs. The present invention also provides such a method.

SUMMARY OF THE INVENTION

The present invention provides a method for making high service temperature rubber compounds and hot melt adhesive/sealant compositions by combining a polyphenylene ether resin with an elastomeric block copolymer of a vinyl aromatic hydrocarbon and a conjugated diene. The method comprises first making a masterbatch of 2 to 50 phr, preferably 5 to 30, of a polyphenylene ether resin having an intrinsic viscosity (IV) of 0.3 deciliters per gram or more and 100 phr of said block copolymer by extruding them together with 2 to 30 phr of an endblock compatible resin. This masterbatch can be used by itself or compounded further with other ingredients to form adhesive, sealants or rubber compounds. This method is also advantageously utilized with a polyphenylene ether having an intrinsic viscosity of less than 0.3 deciliters per gram. If the low molecular weight PPE is used, the endblock resin is not necessary. Phr is parts by weight per 100 parts rubber wherein "rubber" refers to the block copolymer.

The present invention also encompasses the masterbatch described above and the product of the process described above. The product utilizing the lower molecular weight PPE is characterized by lower viscosity which is important for rubber compounds and adhesives/sealants. Surprisingly, the masterbatch product made with the higher molecular weight PPE and the endblock compatible resin exhibits a viscosity and service temperature which is comparable and almost equivalent to that of the composition made using the lower molecular weight PPE. This is advantageous because the desired result can be achieved without having to use the difficult to manufacture lower molecular weight PPE. Also, when the masterbatch is let down into a typical sealant formulation, sealant with the endblock resin/PPE blend, it performs as well as the formulation with the pure 0.4 IV PPE indicating there is better utilization of the high temperature PPE component.

DETAILED DESCRIPTION OF THE INVENTION

The block copolymers which form the base polymer for the adhesive and sealant compositions of the present invention are thermoplastic elastomers which are block copolymers of vinyl aromatic hydrocarbons and conjugated dienes. The polymers have to have at least two vinyl aromatic hydrocarbon blocks and at least one elastomeric conjugated diene block. The number of blocks in the block copolymers is not of special importance and the macromolecular configuration may be linear, graft, radial or star, depending upon the method by which the block copolymer is formed. Typical block copolymers of the most simple configuration would have the structure polystyrene-polyisoprene-polystyrene or polystyrene-polybutadiene-polystyrene. It is highly preferred that the block copolymers be hydrogenated because it allows more flexibility in mixing conditions because higher temperatures can be used. A typical radial polymer would comprise one in which the diene block has three or more branches and the tip of each branch is connected to a polystyrene block. The branches are connected together or coupled to a coupling agent in the center. Star polymers are similar to radial polymers except that they have many more arms and the coupling agent is usually a multifunctional material such as divinyl benzene. Further descriptions of such block copolymers and methods for making them are taught in U.S. Pat. Nos. 3,231,635, 3,265,765, 3,322,856, 4,096,203, 4,391,949, and 5,104,921, which are herein incorporated by reference.

The preferred vinyl aromatic hydrocarbon used in these block copolymers is styrene. Other useful vinyl aromatic hydrocarbons include α-methylstyrene, various alkyl-substituted styrenes, alkoxy-substituted styrenes, vinyl napthalene, vinyl toluene and the like. The preferred conjugated dienes are butadiene and isoprene. Other dienes which may be used include piperylene, methylpentadiene, phenylbutadiene, 3,4-dimethyl-1,3-hexadiene, 4,5-diethyl-1,3-octadiene and the like. Preferably, those conjugated dienes containing four to eight carbon atoms. The diene segment of the block copolymer also can be hydrogenated to eliminate the double bonds.

The molecular weights of these block copolymers vary from as little as 10,000 up to as much as 2,000,000. The molecular weights of such block copolymers are usually and most advantageously determined as the peak molecular weight as determined by gel permeation chromatography, a well known and well documented method described in many patents including U.S. Pat. Nos. 5,229,464 and 5,247,026, which are herein incorporated by reference. For use in rubber compounds (compounds containing the block copolymers and polyolefins, such as polypropylene and polyethylene, and/or other thermoplastics, such as nylon, polycarbonate, etc., and other ingredients such as plasticizers and fillers) and adhesive and sealant compositions utilizing PPE resins, it is preferred that the molecular weight of these block copolymers (as determined by Gel Permeation Chromatography-peak molecular weight) range from 30,000 to 1,500,000 with the molecular weight of the vinyl aromatic hydrocarbon blocks ranging from 5000 to 30,000 and the molecular weight of the conjugated diene blocks ranging from 20,000 to 150,000.

The low molecular weight polyphenylene ether resins are low molecular weight resins having an intrinsic viscosity of less than 0.3 deciliters per gram, when measured in solution in chloroform at 30° C. The higher molecular weight resins described according to the present invention have an intrinsic viscosity of 0.3 deciliters per gram or more.

The polyphenylene ether resin is preferably one which is comprised of the formula:

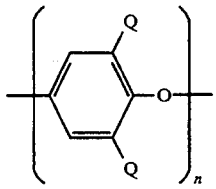

wherein the oxygen ether atom of one of the units is connected to the benzene nucleus of the next adjoining unit, n is a positive integer and each Q is a monovalent substituent selected from the group consisting of hydrogen, halogen, hydrocarbon radicals free of a tertiary α-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

For purposes of the present invention, an especially preferred family of polyphenylene ethers includes those having alkyl substitution in the two positions ortho to the oxygen ether atom, i.e., those of the formula wherein each Q is alkyl, most preferably having from one to four carbon atoms. The most preferred polyphenylene ether resin for the purposes of this invention is poly(2,6-dimethyl-1,4-phenylene)ether.

In general, the polyphenylene ether resins of this invention can be prepared by the following procedures fully described in U.S. Pat. Nos. 3,306,874 and 3,257,375, which are herein incorporated by reference. The polyphenylene ethers are self-condensation products of monohydric monocyclic phenols typically produced by reacting the phenols in the presence of a complexing agent or complex metal, e.g., copper catalyst. In general, the molecular weight will be controlled by the reaction time with longer times providing a higher average number of repeating structural units. For low molecular weight PPE, at some point before an intrinsic viscosity of 0.3 deciliters per gram, is obtained, the reaction is terminated. Obviously, for higher molecular weight PPE, the reaction is continued until the desired molecular weight is achieved. Termination can be brought about by the use of conventional means. For instance, in the case of reaction systems which make use of complex metal catalysts, the polymerization reaction can be terminated by adding an acid, e.g., hydrochloric or sulfuric acid, or the like, or a base, e.g., lime sodium hydroxide, potassium hydroxide, and the like, or the product is separated from the catalyst by filtration, precipitation or other suitable means.

The endblock compatible resin is a resin which is compatible with the polymer block which is normally on the end of the block copolymers of the present invention, i.e., the vinyl aromatic hydrocarbon block. Such endblock compatible resins are often used as reinforcing agents. Normally, these resins should have a ring and ball softening point between 80° C. and 150° C. although mixtures of aromatic resins having high mid low softening points may also be used. Useful resins include coumarone-indene resins, poly alpha methyl styrene, polystyrene resins, vinyl toluene-α-methyl styrene copolymers and polyindene resins.

Examples of aromatic resins useful in the formulations of the present invention are AMOCO® 18 series resins, which are composed of alpha methyl styrene (AMOCO), Kristalex® series resins, which are composed of alpha methyl styrene (HERCULES), PICCOTEX® Series resins, which are composed of alpha methyl styrene and vinyl toluene (HERCULES), NEVCHEM® (NEVILLE) and PICCO 6000 (HERCULES) series resins, which are composed of aromatic hydrocarbons, CUMAR® series resins and CUMAR LX-509 (NEVILLE), which are composed of coumarone-indene, PICCOVAR® AP series resins (HERCULES), which are composed of alkyl aryl species, PICCOVAR® 130 (HERCULES), which is an alkyl aromatic poly indene resin, and ENDEX® 155 (HERCULES), a resin derived by copolymerization of pure aromatic monomers.

The method of the present invention provides high service temperature rubber compounds and hot melt adhesive/sealant compositions. For example, the method involves making a masterbatch of 20 phr of a polyphenylene ether having an intrinsic: viscosity of 0.4 deciliters per gram and 100 phr of a block copolymer of a vinyl aromatic hydrocarbon and a conjugated diene by extruding the two together with 10 phr of the endblock compatible resin. The final step of the process for adhesives and sealants is mixing the masterbatch with 90 to 250 phr of a tackifying resin and, optionally, more of the block copolymer to form the adhesive or sealant composition. The masterbatch could also be combined with polyolefin resins such as polypropylenes or polyethylene plasticizers and fillers to form rubber compounds.

It is important to note that the masterbatch method is also advantageous to use when a low molecular weight PPE, i.e., a PPE having an intrinsic viscosity of less than 0.3 deciliters per gram, is used. The masterbatch is made in the same manner but the endblock compatible resin is not necessary. This blend with the lower molecular weight PPE has the characteristics of high service temperatures without the increase in viscosity that is normally associated with the use of the higher molecular weight PPE. Quite surprisingly, when the masterbatch method is used with a high molecular weight PPE and an endblock compatible resin, the service temperatures and the viscosities of such masterbatch blends are comparable to and almost equivalent to the service temperatures and viscosities of blends using the lower molecular weight PPE.

The masterbatch is made by introducing the PPE and the block copolymer into a Berstroff twin screw extruder, for example, and running them through the extruder at a temperature of about 250° C. to about 310° C. The same mixing conditions can be used when an endblock resin is added with the advantage being lower viscosity.

The key advantage of the present invention is providing a formulation which has a higher service temperature than formulations utilizing the block copolymers alone. The addition of the PPE increases the service temperature as well as the viscosity. The use of these formulations helps to improve the heat distortion properties of the thermoplastic elastomers and make them more useful in automotive, wire and cable, and other applications involving high temperatures.

The masterbatch of the present invention is formed under high shear conditions in an extruder. This allows the production of a very well mixed and very compatible blend of the two or three components involved. The extremely well mixed and compatible condition of the masterbatch makes it possible to take the masterbatch and mix it with other formulating ingredients such as resins, plasticizers, and polyolefins in standard commercial mixing equipment which is much lower shear than an extruder (such as a Sigma Blade mixer or Banbury mixer) and still produce very good compositions whether rubber compounds or adhesives or sealants.

It may be necessary to add a different kind of adhesion promoting or tackifying resin that is compatible with a polymer. A common tackifying resin is a dieneolefin copolymer of piperylene and 2-methyl-2-butene having a softening point of about 95° C. This resin is available commercially under the tradename WINGTACK® 95 and is prepared by the cationic polymerization of 60 percent piperylene, 10 percent isoprene, 5 percent cyclopentadiene, 15 percent 2-methyl-2-butene and about 10 percent dimer, as taught in U.S. Pat. No. 3,577,398. Other adhesion promoting resins which are also useful in compositions of the present invention include hydrogenated rosins, esters of rosins, polyterpenes, terpene phenol resins and polymerized mixed olefins, lower softening point resins and liquid resins. An example of a liquid resin is Regalrez® 1018 resin (a hydrogenated pure monomer resin) from Hercules. The amount of adhesion promoting resin employed varies from 0 to 400 parts by weight per 100 parts rubber (phr—the term "rubber" refers to the block copolymer). The selection of the particular tackifying resin is, in large part, dependent upon the specific polymer employed in the respective adhesive or sealant composition.

The compositions of the present invention may contain plasticizers or compounding oils or organic or inorganic pigments and dyes. Optional components are stabilizers which inhibit or retard heat degradation, oxidation, skin formation and color formation. Various types of fillers and pigments can be included in the robber compound or adhesive/sealant formulation. A wide variety of fillers can be used including calcium carbonate, clays, talcs, silica, zinc oxide, titanium dioxide and the like. Polyolefin resins such as polypropylene, polyethylene copolymers of ethylene/octene or ethylene/hexene can also be used.

EXAMPLES

The following examples include masterbatches made with a high molecular weight PPE and an endblock resin and a hydrogenated block copolymer of a vinyl aromatic hydrocarbon and a conjugated diene as well as masterbatches made with the block copolymer and a low molecular weight PPE without the endblock resin. For comparative purposes, a blend has been made of a high molecular weight PPE, an endblock compatible resin and the block copolymer. Also provided is a masterbatch blend of a high molecular weight PPE and a block copolymer (a commercial product) without the endblock compatible resin. Sealant compositions were made from all of these blends and the properties of these compositions are described below. The masterbatches were prepared in a Berstroff ZE-25 co-rotating intermeshing twin screw extruder using mixing temperatures of 300° C. and 300 RPM. The sealant formulations were mixed in ½ liter Baker Perkins Sigma Blade mixer at 177° C. for 5 hours.

Table 1 shows masterbatch formulations mixed on the Berstroff extruder and their properties.

TABLE 1

| Ingredient (parts by weight) | Masterbatch A | Masterbatch B | Masterbatch C | KRATON® G 1652 |
|---|---|---|---|---|
| KRATON® G 1652[1] | 100 | 100 | 100 | 100 |
| PPE (IV = 0.4) | 30 | | 20 | |
| PPE (IV = 0.13) | | 30 | | |
| ENDEX® 155 | | | 10 | |
| Irganox 1010 | 0.5 | 0.5 | 0.5 | |
| Peak in Tan Delta value (C) at 10HZ | No apparent peak | 155 | 155 | 95 |
| Dynamic viscosity in poise at 200° C. and 100 radians/sec | 48,000 | 26,000 | 26,000 | 25,000 |

TABLE 1-continued

| Ingredient (parts by weight) | Masterbatch A | Masterbatch B | Masterbatch C | KRATON ® G 1652 |
|---|---|---|---|---|
| Appearance | Amber colored pellets with a slight haze | Clear amber pellet | Clear amber pellet slightly lighter in color than the other blends | Clear |

[1]A hydrogenated styrene-butadiene-styrene block copolymer with a molecular weight of 53,000.

The masterbatches were characterized using a Rheometrics Mechanical Spectrometer Model 800 and a rectangular torsional bar geometry (Thickness=251 mm, Width=2.5 mm, Length-45.25 mm). A dynamic frequency/temperature sweep procedure was utilized at 10 and 100 rad/sec, with a step of 10° C./minute. The tan delta value is the ratio of the loss and stored energy G''/G' in the dynamic experiment. The tan delta value will exhibit a maximum at the temperature at which the styrene domains of the block copolymer experiences a glass transition. The dynamic viscosity is a measure of the viscosity of the sample at a given temperature.

As can be seen from Table 1, lowering the IV or molecular weight of the PPE increases the compatibility with the endblock as manifested by a very clear tan delta peak and at the same time reduces the viscosity of the blend significantly. Surprisingly, the same thing can be accomplished by adding the endblock resin ENDEX® 155 to a high molecular weight PPE in the masterbatch in the proportions shown above. The clarity of the PPE/ENDEX®/KRATON® G1652 blend was also a very good indication of good compatibility.

The masterbatches were then mixed into sealant formulation the proportions shown in Table 2.

TABLE 2

| Ingredient (parts by weight) | Sealant A | Sealant B | Sealant C | Sealant D | Sealant E |
|---|---|---|---|---|---|
| Masterbatch A | 130 | | | | |
| Masterbatch B | | 130 | | | |
| Masterbatch C | | | 130 | | |
| KRATON ® G1652 | | | | 100 | 100 |
| ENDEX ® 155 | | | | | 30 |
| Regalrez ® 1018 | 250 | 250 | 250 | 250 | 250 |
| Properties | | | | | |
| Brookfield Viscosity (177° C.) | 12,500 | 24,000 | 11,600 | 2,300 | 2,700 |
| Slump Temp (°C.) | 105 | 140 | 100 | <70 | <70 |
| Appearance | Amber and opaque | Amber color and hazy | Light amber and opaque | Clear | — |

A Brookfield Viscometer model RVTD and spindle 29 was used to measure the viscosity at 177° C. To measure the slump temperature, the sealant formulations were poured hot and allowed to solidify in metal channels with the following dimensions: 2.0 cm wide, by 2.5 cm high, and 1.5 cm deep. The channels were placed vertically in an oven and the temperature was raised in 5° C. increments, allowing the sample to equilibrate for 10 minutes at each temperature before increasing the temperature again. The slump temperature was the temperature at which the sample moved more than 3/16 inch in the channel. As can be seen from Table 2, PPE in the formulation significantly improves the slump temperature compared with the pure ENDEX®155 or the sealant with no endblock resin. This would be expected since the PPE is significantly increasing the glass transition temperature of the endblock. Sealant C made with the masterbatch of high molecular weight PPE (IV=0.4) and the ENDEX® shows almost the same slump temperature properties even though there is less PPE in the total formulation. This would indicate that the endblock resin is useful in increasing the compatibility and efficiency of the PPE in the system, i.e. less PPE can be used to accomplish the same result.

We claim:

1. A method for making high service temperature rubber compounds and hot melt adhesive and sealant compositions by combining a polyphenylene ether resin with an elastomeric block copolymer of a vinyl aromatic hydrocarbon and a conjugated diene, which comprises:

(a) making a masterbatch of 2 to 50 phr of a polyphenylene ether having an intrinsic viscosity of 0.3 deciliters per gram or more and 100 phr of said block copolymer by mixing them together with 2 to 30 phr of an endblock compatible resin in a twin screw extruder, and (b) mixing the masterbatch with more of the block copolymer.

2. The method of claim 1 with the additional step of mixing the masterbatch with other formulating ingredients.

3. The masterbatch of step (a) of claim 1.

4. The product of the process of claim 1.

* * * * *